March 19, 1963     E. F. W. ALEXANDERSON     3,082,367
ELECTRIC MOTOR CONTROL APPARATUS Filed Sept. 25, 1959     5 Sheets-Sheet 1

INVENTOR
Ernst F. W. Alexanderson

March 19, 1963

E. F. W. ALEXANDERSON 3,082,367

ELECTRIC MOTOR CONTROL APPARATUS

Filed Sept. 25, 1959

INVENTOR

Ernst F. W. Alexanderson

March 19, 1963  E. F. W. ALEXANDERSON  3,082,367
ELECTRIC MOTOR CONTROL APPARATUS
Filed Sept. 25, 1959

INVENTOR
Ernst F. W. Alexanderson

United States Patent Office 3,082,367
Patented Mar. 19, 1963

3,082,367
ELECTRIC MOTOR CONTROL APPARATUS
Ernst F. W. Alexanderson, 1132 Adams Road,
Schenectady, N.Y.
Filed Sept. 25, 1959, Ser. No. 842,515
3 Claims. (Cl. 318—347)

My invention relates to electric control apparatus and more particularly to electric circuit control means employing saturable reactors and diodes, in a form usually referred to as magnetic amplifiers, for controlling electric utilization circuits such as dynamo-electric machines.

Due to the precision of control and operation of which magnetic amplifiers are susceptible, apparatus of this nature has been applied heretofore to the control of dynamo-electric machines. Therefore, in the prior applications, variable speed drives have been obtained with separately excited D.C. motors and also by series types of D.C. motors. Such systems have had, however, some definite limitations. The separately excited motor can be operated with a controlled and reversible torque at any speed only at great loss of efficiency. A system has been described in the technical literature showing a series type of motor which can be operated with a controlled reversible torque at any speed. It requires a duplicate magnetic amplifier for forward and reverse operation. The speed torque characteristics are, however, that of the conventional series D.C. motor. For some purposes, such as electric traction, the series motor is highly useful but for some other purposes the speed torque characteristics are very objectionable. A further advance in this art is shown in my U.S. Patent 2,752,549, June 26, 1956, Magnetic Amplifier Motor Control. This system eliminates the duplication of the power amplifier and provides a separate amplifier for reversible field control.

The present invention is in a sense a further development and an improvement of the system described in said patent. The new features consist in the introduction of a new type of magnetic amplifier and in the means used for attaining the desired results. The amplifier is so constituted that it is self-regulating so that at any setting of the operator's remote control, it maintains a substantially constant ratio between voltage and current output while the absolute value of output may vary from no load to full load.

It is one object of my invention to provide a new and improved magnetic amplifier network.

It is another object of my invention to provide a new and improved magnetic amplifier control system for direct current utilization circuits, such as direct current motors.

It is a further object of my invention to provide a new and improved system for controlling the speed and torque and the direction of rotation of a direct current motor.

Briefly stated, in accordance with one aspect of my invention, I provide a magnetic amplifier network which by a self-regulating process maintains a substantially constant ratio between voltage and current regardless of the absolute values of voltage and current and further provide remote control means for adjusting the ratio of voltage to current which the amplifier tends to maintain in its output circuit. In accordance with another aspect of my invention, I relate the output characteristics of the amplifier with a direct current utilization circuit, such as a direct current motor, to provide a remote control adjustable system which tends to maintain an adjustable constant ratio of voltage to current output in the utilization circuit or in the case of a direct current series motor to provide an adjustable speed drive. A further aspect of my invention in its application to motor control systems is the provision of circuitry in relation to the amplifier whereby the speed of the motor may be adjusted at any desired value from standstill to its maximum rate of speed in either direction and the torque thereof adjusted with a gradual transition from positive to negative torque at any operating speed without mechanical shock or abrupt change in flow of current.

The subject matter which I regard as my invention is particularly pointed out and distinctly claimed in the concluding portion of this specification. My invention, however, both as to organization and method of operation, together with further advantages thereof, may best be understood by reference to the following description taken in connection with the accompanying drawings in which:

Figure 1:
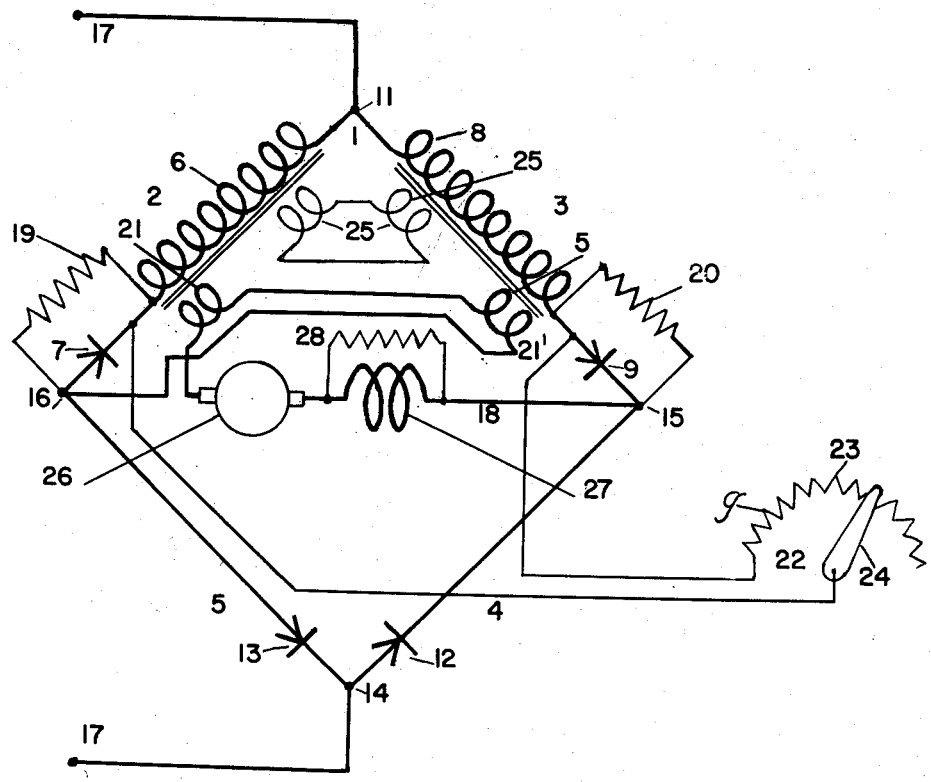
FIG. 1 is a diagrammatic illustration of one embodiment of my magnetic amplifier as applied in a series motor control system.

Referring to FIG. 1 of the drawings, I have diagrammatically illustrated one form of my magnetic amplifier network as applied to a system for providing an adjustable speed drive for one direction of operation of the motor. The magnetic amplifier network 1, for purpoe of illustration, is shown in the form of a four-branch bridge arrangement comprising branches 2, 3, 4 and 5. Branch circuits 2 and 3 comprise respectively a saturable reactor 6 connected in a series relation with a diode rectifier 7 and a saturable reactor 8 connected in series relation with a diode rectifier 9. The terminals of saturable reactors 6 and 8 opposite to the diode-connected terminals are connected together to form an input junction 11. The branch circuits 4 and 5 comprise respectively diodes 12 and 13 and are connected together at one end to form an input junction 14. The conjugate terminals 11 and 14 thus form the alternating current input terminals of the bridge network. The remaining terminal of branch circuit 4 is connected to the remaining terminal of branch circuit 3 to form an output junction 15 and similarly the remaining terminal of branch circuit 5 is connected to the remaining terminal of branch circuit 2 to form a second output junction 16. The conjugate terminals 15 and 16 thus form the direct current output terminals of the bridge network. An alternating current supply circuit 17 is connected to input terminals 11 and 14. The respective diodes 9 and 13 are poled to pass current from junction 11, when at positive potential, then through branch 3 to junction 15, thence across the diagonal 18 of the bridge to junction 16 and thence through branch 5 to junction 14 and the return side of supply circuit 17. The diagonal circuit 18 will be assumed for the moment to be a general direct current utilization circuit. The respective diodes 12 and 7 are poled to pass current from junction 14, when of positive potential, through branch 4 thence across the diagonal 18 of the bridge to junction 16 and thence through branch 2 to output junction 11. In other words, upon the assumption of a single diagonal branch circuit spanning junction points 15 and 16, such branch circuit would be traversed by unidirectional currents constituted of both half waves of the alternating current supply.

In order to provide a negative feedback proportional to the output voltage of the bridge, resistances 19 and 20 are connected in parallel with diodes 7 and 9 respectively. Such feedback, if desired, may be provided by a separate control winding connected to be responsive to the output voltage of the bridge, but I have found the resistances as specified preferable.

In order to provide positive feedback proportional to the output current of the bridge, I provide control windings 21 and 21' connected in series relation with the diagonal output circuit 18. These windings 21 and 21' are placed in inductive relation with the respective reactors 6 and 8 respectively with current flow to produce a flux additive to that of the associated reactor.

The magnetic amplifier network so far described tends, by a self-regulating process, upon the application of alternating current to its input terminals 11 and 14, to maintain a substantially constant voltage to current ratio. The resistances 19 and 20 across the diodes 7 and 9 respectively introduce into the network through the windings of the respective reactors 6 and 8 a negative feedback current proportional to the output voltage and the coils 21 and 21' traversed by the current in circuit 18 proportional to the load current and inductively associated with the reactors 6 and 8 respectively introduce into the network a positive feedback. Equilibrium is then reached in the network at a fixed voltage to current ratio when the two feedbacks neutralize each other.

In applications requiring an adjustable output function, however, it would not be sufficient that the amplifier network develops an electrical output characteristic with a single fixed voltage to current ratio. In various applications likely to be made, it is believed that the ratio should be adjustable and for convenience and ease of operation some control be provided preferably at a point remote from the amplifier network and its load circuit. For this purpose a remote control variable resistance unit 22 may be provided. This control unit 22 comprises a resistance element 23 and an adjustable arm 24 with the resistance element 23 connected through its free terminal and adjustable arm 24 across the terminal ends of reactors 6 and 8 at the respective junction points with diodes 7 and 9 respectively. In other words, the resistance 23 is connected in the amplifier network so as to form a closed circuit through the reactors 6 and 8. As thus connected relative to the several diodes a unidirectional current flows in this branch resistance circuit of unit 22 which is proportional to the power current of the network and inversely proportional to the value of the control resistance 23. This circulating current which traverses the reactors 6 and 8 acts upon the reactors as a negative feedback proportional to the power current. This negative feedback partly neutralizes the positive feedback applied through the control windings 21 and 21'. The resultant feedback can thus be adjusted by adjusting the amount of resistance 23 which is included in the circulating current branch. When this resistance is zero, the resulting feedback is zero. Thus by adjustment of control resistance 23 from zero to maximum, it is possible to adjust the effectiveness of the resultant feedback and thus the ratio of voltage to current which the amplifier network tends to maintain. In order to suppress any tendency of the amplifier network with its several feedback components to hunt or develop instability in the self-regulating process, I provide a control winding 25 placed in inductive relation with the reactors 6 and 8 and close the current of the winding upon itself thus to form a closed circuit. The control winding responds to the rate of change of the saturating flux and thereby modifies the time of response of the amplifier to match the response of the system to be regulated.

Having described the basic amplifier network of my invention, attention will now be directed to an exemplary motor control application for which it is well adapted. A series direct current motor has the characteristic that the ratio of voltage to current is substantially constant at any speed. Accordingly I have shown in FIG. 1 a series direct current motor connected in series relation in the general direct current utilization circuit 18. The motor is represented as comprising an armature 26 and a series field winding 27 which is provided with a resistance 28 in parallel relation to bypass rectification harmonics. The positive feedback coils 21 and 21' are connected in series relation with the motor armature 26 and field winding 27 respectively. Therefore, with the series motor energized from an amplifier network having the characteristics described above, it will maintain a given speed when the volts to amperes ratio consumed by the motor matches the ratio of volts to amperes delivered by the amplifier. It furthermore follows that if the amplifier is readjusted by adjusting resistance 23 to provide a different ratio of volts to amperes in the amplifier network, the motor will adjust itself correspondingly. Thus by the simple process of changing the resistance element 23 between its minimum and maximum limits, the motor speed may be adjusted at any value for rotation in one direction from standstill to its maximum speed and vice versa.

Figure 2:
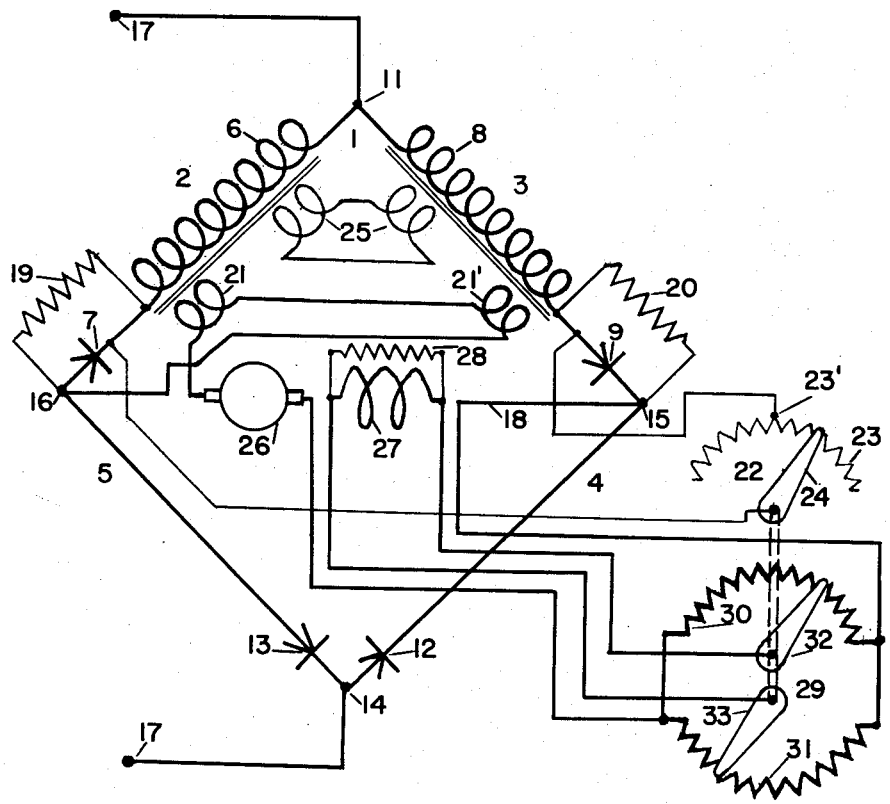
FIG. 2 is a modification of the embodiment of FIG. 1 with additional circuit means for reversing the direction of rotation of the motor and for reversing its torque at any speed.

In FIG. 2 of the drawings I have illustrated a modification of my invention which incorporates the speed variation aspect similar to the arrangement shown in FIG. 1 with additional means for reversing the rotation of the motor and for reversing the torque at any speed. The latter feature provides for dynamic braking. The components in FIG. 2 corresponding to like components in FIG. 1 have been assigned the same reference numerals.

The change in the adjusting unit 22 comprises the provision in resistance unit 23 of a central tap 23' which is connected to the junction point between reactor 8 and diode 9. The change thus provides a neutral position for the ratio adjuster arm 24 where the output of the amplifier network is zero. The adjuster 22 thus has two branches from the neutral position 23' so that a turn of arm 24 to the right or to the left (as viewed in the drawing) produces the same effect of increasing the output of the amplifier.

The additional control equipment which has been introduced into the arrangement shown in FIG. 2 is a twin rheostat 29 comprising resistance arms 30 and 31 provided with contacts 32 and 33. The resistance arms are connected in parallel relation with each other and in series relation between point 15 and the motor armature. The series field winding 27 is connected to the respective contact arms 32 and 33 which in turn are positioned on the associated resistance arms 30 and 31 so that when the respective arms are moved from a neutral position on the resistance arms of the rheostat the field excitation is reversed. The contact arms 24, 32 and 33 are interconnected for simultaneous movement and positioned so that each of the several arms will be on the neutral position of its associated resistance arm, namely resistances 23, 30 and 33 respectively when any arm is moved to a neutral position.

The operation of the embodiment illustrated in FIG. 2 is substantially as follows: With the respective control arms in their neutral positions the output of the amplifier network is zero and the motor would be at standstill with the series field unenergized and maximum resistance of the rheostat 29 in series with the armature 26. A turn of the control arm 24 to the right produces the effect of increasing the output of the magnetic amplifier and establishing the torque of the motor at standstill. When the motor torque has overcome the standstill resistance of the load, it attains the speed where the ratio of volts to amperes consumed by the motor and the rheostat 29 matches the ratio of volts to amperes delivered by the amplifier as determined by the ratio adjuster 22. At the same time the power of the magnetic amplifier is increased and the resistance of the rheostat 29 in series with the motor is decreased and the series field excitation is increased. At the extreme right hand position of the arm 24 the ratio of volts to amperes of the amplifier is a maximum and the series field excitation relative to the armature current is maximum. If it is desired to reverse the direction of rotation and the torque, the ratio adjusted 24 along with arms 32 and 33 are moved from the last right hand position to the left (as viewed in the drawings) so that the respective arms move through their neutral positions simultaneously. When the assembly of control rheostats passes through neutral, it simultaneously reverses the relationship of armature and field and suppresses the output of the amplifier so that the reversal takes place when the motor current is zero. The result is a reversal of motor torque and this reversal can take place while the motor with its load are still moving in the same direction so that the reversed torque becomes a braking torque.

Figure 3:
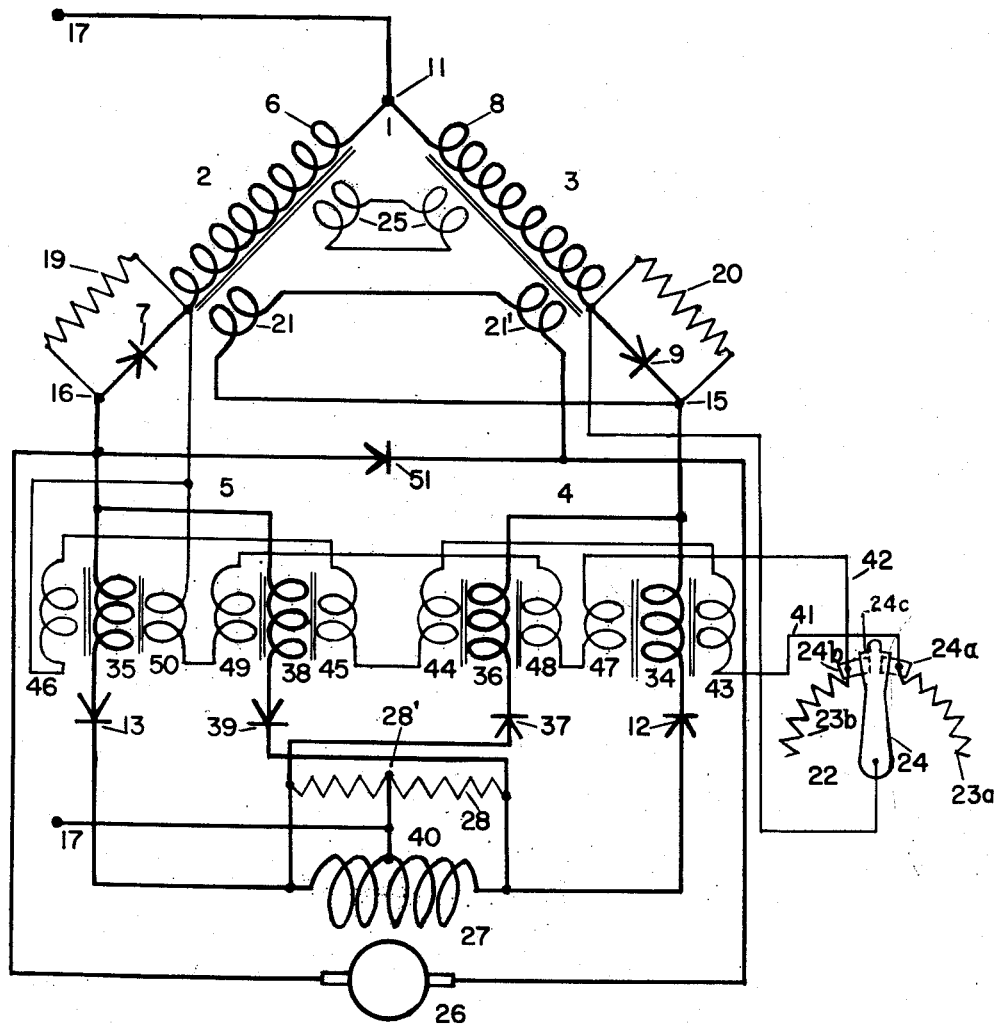
FIG. 3 is a further modification of the arrangements of FIG. 1 and FIG. 2 with remote control means.

In FIG. 3 of the drawings I have illustrated a further modification of the embodiment of my invention illustrated in FIG. 1 and FIG. 2 with a different form of the ratio adjusted 22 and a change of the means for controlling the magnitude and direction of energization of the field winding of the motor 26. The components in FIG. 3 corresponding to like components in FIG. 1 and FIG. 2 have been assigned the same reference numerals.

The change in the ratio adjuster 22 for controlling the output of the amplifier network 1 comprises the division of the resistance element thereof into two branches 23a and 23b with a terminal contact 24a on resistance 23a and terminal contact 24b on resistance branch 23b. The termial contacts 24a and 24b are positioned adjacent to each other so as to be bridged by a bridging contact 24c of the adjusting arm 24 when this arm is placed in a neutral position as illustrated. The adjusting arm 24 is connected to the junction point between reactor 8 and its associated diode 9 in arm 3 of the amplifier. The circuits for introducing the resistance branches 23a and 23b in the amplifier network will be described later. It will suffice at the moment to note that the resistance arm 23a and 23b are introduced and become active in the circuit alternatively by turning the adjusting arm 24 to the right for resistance arm 23a and to the left for resistance arm 23b.

In the lower part of the amplifier-network which in FIG. 1 and FIG. 2 consists of simple parts of diodes 12 and 13 is developed into a pair of magnetic amplifiers which are activated alternatively so as to pass the power current of the network through the field winding 27 of the motor in a forward or reverse direction. The "forward" amplifier comprises a reactor 34 connected in series relation with diode 12 of the basic network arm 4, and a reactor 35 in series relation with diode 13 of the basic network arm 5. The series field winding 27 is connected to free terminals of the respective diodes 12 and 13 so as to complete the basic bridge circuit.

The "reverse" amplifier comprises a reactor 36 with one terminal connected to junction 15 and further connected in series relation with diode 37. The remaining terminal of diode 37 is connected to the end of field winding which is opposite or reversed with respect to the field winding to which diode 12 is connected. The other arm of the reverse amplifier comprises a reactor 38 with a terminal connected to junction 16 and further connected in series relation with diode 39. The remaining terminal of diode 39 is connected to the opposite end of field winding 27 relative to the connection of diode 37. The field winding 27 is shunted by a resistance 28 to suppress harmonics and the latter is provided with a midpoint connected terminal 28' which is interconnected with a midpoint connection terminal 40 on the field winding 27. One of the alternating current power supply conductors 17 is connected to the conductors between the respective midpoints of resistor 28 and field winding 27 and the other supply conductor 17 is connected to the input junction 11.

To return to the connection of the resistance branches 23a and 23b of the ratio adjuster 22, it will be noted that the adjusting arm 24 has a single conductor connecting this arm to the junction point between reactor 8 and diode 9 of the amplifier network 3. The two resistance branches 23a and 23b are connected to separate "return" conductors 41 and 42 respectively. The return conductor 41 has connected in series therewith four control coils 43, 44, 45 and 46 which are inductively related to the forward and reverse reactors in the order 34, 36, 38 and 35. The free terminal of control coil 46 is connected to the junction point between reactor 6 and its associated diode 7.

In general, the control coils of circuit 41 span the upper arms of the network bridge in the same electrical relation as resistance 23 of ratio adjusted 22 spans the bridge in the simplified circuit of FIG. 1. The "return" conductor 42 has connected in series therewith four coils 47, 48, 49, 50, which are inductively related to the "forward" and "reverse" reactors in the order 34, 36, 37 and 35. The free terminal of control coil 50 has a connection in common with control coil 46 to the junction between the network reactor 6 and its associated diode 7. A diode 51 is connected in shunt to the armature winding 26. The diode is poled so that it is nonconductive during motor operation and conductive to provide a current path during dynamic braking.

The operation of the embodiment illustrated in FIG. 3 is in principle the same as that described for FIG. 2. In this case the power is introduced through the midpoint 40 of the series field winding 27. The positive and negative halfwaves of the alternating current supply from conductor 17 pass in a given direction through the left branch and the right branch respectively of the field winding 27. When the forward amplifier comprising reactors 34 and 35 is saturated, the "reverse" amplifier comprising reactors 36 and 38 is desaturated and vice versa. The two amplifiers are controlled by the current which flows through the ratio adjusting resistances 23a and 23b as selectively determined by the adjusting arm 24. Currents in either of the control circuits 41 and 42 have the same effect on the ratio or output of the amplifier network. For example, with the arm in the neutral position the output of the network is zero while the output can be increased to its maximum by moving the arm 24 to its extreme right or left. However, operation of the contact arm 24 to the right and with current flow in such a direction as to saturate the "forward" reactors 34 and 35 will at the same time desaturate the "reverse" reactors 36 and 38. If the control arm 24 is moved to the left to operate on resistance 23b, the control coils of circuit 42 are arranged to have the opposite effect on both amplifiers, namely on the basis of the above assumption to desaturate the forward reactors 34 and 35 and saturate the reverse reactors 36 and 38. This reversal of the condition of saturation of the forward and reverse reactors effects the reversal of the energization of the series field winding. When the ratio adjuster passes through the neutral position, the output of the network is reduced to zero so that the field is always reversed when the current is substantially zero.

Figure 4:
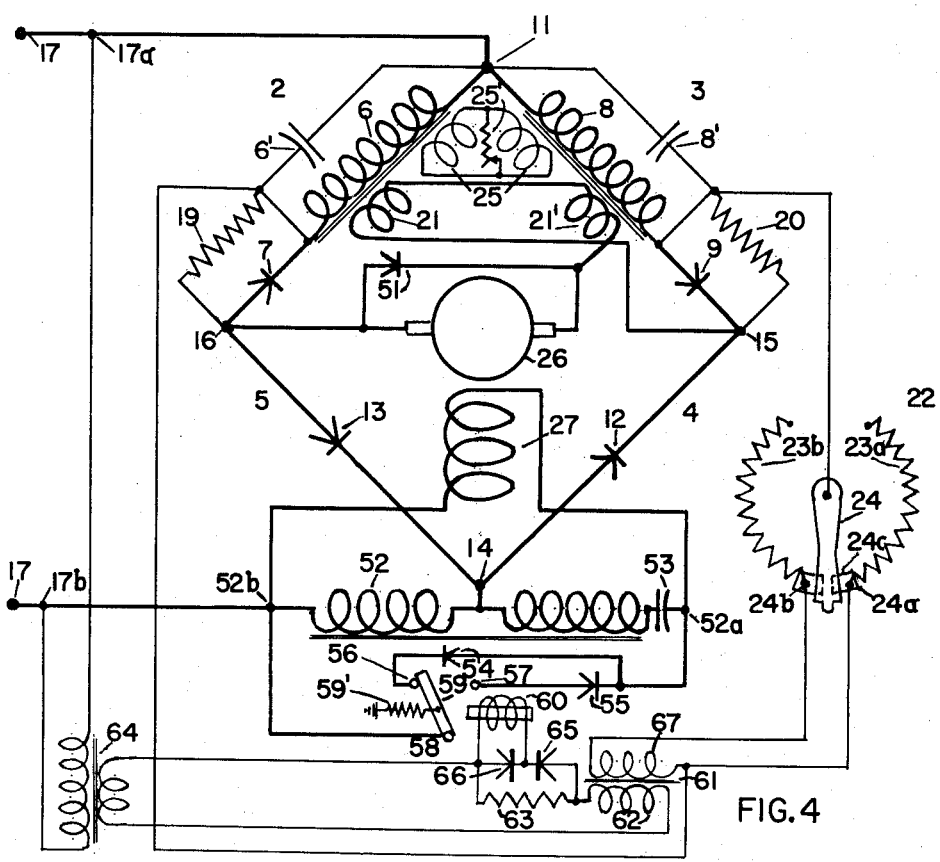
FIG. 4 is a still further modification for obtaining reversibility of the motor to be controlled with different remote control means.

In FIG. 4 of the drawings I have illustrated a still further modification of my invention with the basic amplifier network essentially the same as that shown in FIG. 1 and a ratio adjuster 22 of the type shown in FIG. 3 but with a different method and means for applying reversibility through remote control to the motor 26. For ease of comparison, like components in FIG. 1 and FIG. 3 have been assigned the same reference numerals.

In this arrangement a capacitor 6' is connected in parallel with reactor 6 and a capacitor 8' is connected in parallel with reactor 8. This is a refinement which is not always needed. A magnetic amplifier, when not saturated, passes a minimum current which is the magnetizing current of the reactor. This minimum current may be sufficient to produce a measurable motor torque in a delicately adjusted mechanical system. The object of the capacitor is to neutralize said magnetizing current and thereby reduce the motor torque to practically nil when the control is in the neutral position. The ratio adjuster 22 for controlling the output of the amplifier network comprises the resistance branches 23a and 23b. The terminal contacts 24a and 24b are positioined adjacent each other so as to be bridged by a bridging contact 24c of the adjusting arm 24 when the arm is moved to the neutral position as illustrated.

The motor field supply comprises an autotransformer 52 which has its primary winding in series with the alternating power current by being connected to the input conductor 17 and the lower junction point 14 of the amplifier network. The field winding 27 is connected across the autotransformer 52. A blocking capacitor 53 is connected in series with the output winding of the autotransformer and its function will be explained in connection with other apparatus to be described. A pair of diodes 54 and 55 are selectively connected between the terminals of the field winding 27 through the contacts 56 and 57 of a relay 58. The relay 58 has a contact arm 59 which is biased to contact 56 by suitable biasing means such as spring 59' so as to close a circuit through diode 54 for energization of the field winding in a direction which may be designated for "forward" operation. The relay 58 is also provided with an operating coil 60 so that upon energization of the coil contact arm 59 can be moved to contact 57 and thus establish a circuit for energization of the field 27 in the reverse direction. The operating coil 60 of relay 58 is energized from a small magnetic amplifier 61 comprising a reactor coil 62 connected in series with resistance 63 to be energized from the alternating supply circuit 17 through a transformer 64. The output of the amplifier is supplied to coil 60 through rectifier 65. Another diode 66 is connected in parallel relation to the coil 60 so as to complete the rectification circuit. A control winding 67 for the magnetic amplifier is inductively related to reactor 62 and is connected in series relation between ratio adjuster resistance 23b through contact 24c and the junction point in the main amplifier network between reactor 6 and associated diode 7.

In operation with contact arm on resistance branch 23a, the autotransformer winding 52 is energized by aternating current from the power circuit 17 through the upper arms of the magnetic amplifier network in series relation with the armature of motor 26. If it is assumed that the relay 58 has its contacts in the biased position to contact 56, the series field 27 will be energized with unidirectional current. In this condition the positive halfwaves of the alternating current pass through the field winding 27 and the negative halfwaves are bypassed by diode 54 which is in a closed circuit with the field winding. Upon the operation of the ratio adjuster contact arm 24 to the resistance branch 23b, the control coil 67 of the small control amplifier 61 is energized to activate the relay coil 60 and cause contact arm 59 to close its contact 57. This operation simultaneously opens the circuit of diode 54 and closes the circuit of diode 55 so that the field 27 is now energized by the negative halfwaves of the alternating current supply and the positive halfwaves are bypassed through the closed circuit of diode 55. The blocking capacitor 53 prevents the rectified voltage from feeding back through transformer winding 52. The current in the field winding is continuous and of substantially constant amplitude because of the relatively high reactance of the winding. In the above arrangement the field excitation is changed from forward to reverse when the contact 24 is shifted from resistance branch 23a to branch 23b, whereby the change takes place with relatively light duty on the contacts since the current is substantially zero whether or not the motor has been brought to standstill or the shift was made for torque reversal for dynamic braking when the motor is at speed.

In the arrangement of FIG. 4 the field winding 27 is linked to the amplifier circuit by the current transformer 52 with its primary in series with the A.C. power supply. The object of the use of the current transformer is to make it possible to handle relatively low values of current in the field control circuit. This is important for high power applications, but for small motor drives it may be desirable to simplify the circuit by leaving out the current transformer with its blocking capacitor and to connect the field winding with its shunting diodes or triodes directly in series with the A.C. power supply.

It should be understood that the relation between motor speed and the ratio of voltage to current is in practice an approximation. The saturation of the motor field modifies this relation and the amplifier output departs from the ideal ratio when it approaches the maximum voltage. These departures from the ideal in the field and amplifier circuits tend to offset each other, but for some purposes it is desirable to introduce corrections. A positive bias of the amplifier may serve this purpose and as shown in FIG. 4 a resistance shunt 25' is connected across the pair of control windings 25. The resulting positive bias may be adjustably coordinated with the remote control 22.

Figure 5:
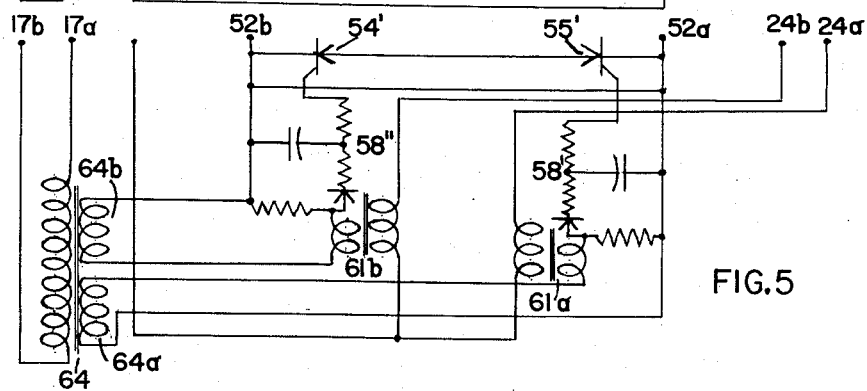
FIG. 5 is a diagrammatic illustration of a control circuit utilizing triodes which may be incorporated in the embodiment of FIG. 4 for a still further modification in the remote control means.

While I have shown in FIG. 4 the relay 58 with controlled diode circuits for the reversing process, it will occur to those skilled in the art that a pair of triodes controlled by a gate or grid circuit responsive to energization from a circuit such as that used relay 61 (FIG. 4) may be used without departing from my invention in its broader aspects. Such an alternative control circuit which may be substituted for the relay arrangement in FIG. 4 is shown in FIG. 5. The several connection points are indicated by numerals corresponding to connection points identifiable in FIG. 4. The transformer 64 may be connected to points 17a and 17b. In this case transformer 64 is provided with two secondary windings 64a and 64b. The selective current directional path for the transformer 52 (or if preferred directly to field winding 27) is provided by two gate or grid controlled triodes 54' and 55'. The energization for the control electrodes is obtained from control amplifiers 61a and 61b through conventional control electrode circuits 58' and 58''. The triodes are selectively energized in dependence upon the energization of the control coil of 61a or 61b by the closure of circuits 24a or 24b by contact 24c of ratio adjuster 22. The reversing process for the field excitation would be the same as that described above for the relay 58 diode arrangement.

Figure 6:
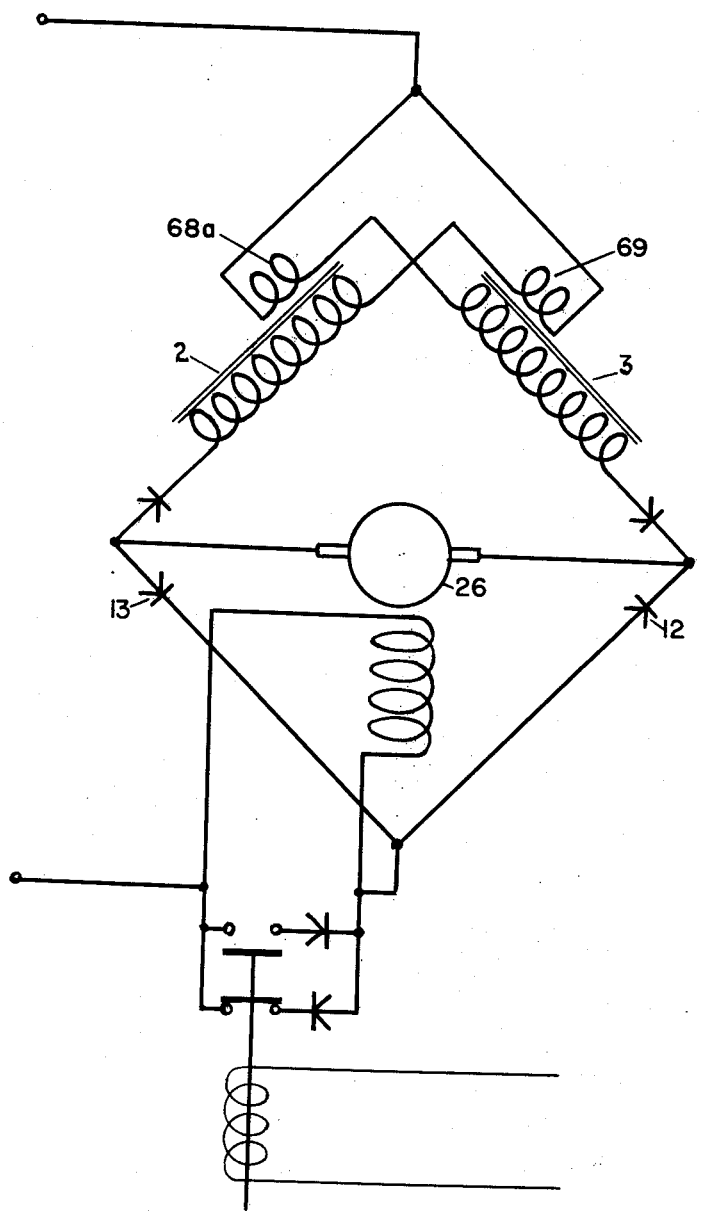
FIG. 6 illustrates an alternative method of applying a positive feedback proportional to current.

FIG. 6 shows an alternative method of applying the positive feedback proportional to current. The effect of this arrangement is the same as that shown in FIG. 4. The object is to provide a path for the current generated by the armature during dynamic braking operation in such a way that said current generated by the armature does not act upon the positive feedback control. In FIG. 4 this is accomplished by applying a diode shunt directly to the armature terminals. In FIG. 6 the same result is accomplished by placing a pair of feedback control windings 68 and 69 in series with the saturable reactors 2 and 3 instead of in series with the rectifier output circuit. Each of said reactors is in series relation with a control coil on the other reactor. This leaves only the motor armature 26 in the rectifier output circuit. A diode shunt is thus applied to the armature terminals. This diode shunt consists of the two lower diodes 12 and 13 of the basic network which are in series relation to each other with reference to the armature terminals. The need for an extra shunting diode is thus eliminated. In other respects FIG. 6 represents the same control system as FIG. 4, the details of which are not illustrated in FIG. 6.

While I have shown and described particular embodiments of my invention, it is my intention to cover in the appended claims all changes and modifications of the examples herein chosen for the purpose of disclosure, which do not constitute departures from the spirit and scope of the invention.

I claim:

1. A motor control system comprising a magnetic amplifier network of the direct current output type having saturable reactors therein, alternating current input terminals and direct current output terminals being provided in said network, a direct current series type motor having armature and field windings connected in circuit with said terminals, negative feedback circuit means in said network connected to be energized in accordance with the output voltage of said network, positive feedback circuit means in said network connected to be energized in accordance with the output current of said network, first impedance means connected in closed circuit with said saturable reactors, means for varying the value of said impedance means, second impedance means being connected in series relation with said armature winding in said output circuit, said field winding being connected to be energized from said impedance means, means for varying the value of said impedance means for changing the magnitude and direction of the current traversing said field winding and the value of impedance in series with said armature winding, and means for interconnecting the varying means of the respective impedance means for simultaneous operation thereof to and from a predetermined position.

2. A motor control system comprising a magnetic amplifier network of the bridge type having arms with diodes in each arm poled for full wave rectification with one set of conjugate terminals of the bridge constituting alternating current input terminals and another set of conjugate terminals constituting direct current output terminals, each arm of one pair of adjacent arms of said bridge comprising a saturable reactor connected in series relation with the diodes of its associated arm, a direct current series type motor having armature and series field windings connected in series circuit relationship in a circuit with said output terminals, negative circuit feedback means for said network connected to be energized in accordance with the voltage of said network, positive feedback circuit means for said network connected to be energized in accordance with the output current of said network, a first adjustable impedance means having a neutral position and operating positions connected in closed circuit with said reactors for varying the output of said network, a second adjustable impedance means having a neutral position and operating positions connected in circuit with said series field winding for controlling the energization thereof from zero to a maximum value in either direction, and means for interconnecting said first and second adjustable impedance means for establishing a neutral non-energizing position simultaneously in the respective adjustable impedance means and corresponding increases or decreases in network output and field excitation as the adjustable impedance means is moved between its neutral position and several operating positions.

3. A motor control system comprising a magnetic amplifier network of the bridge type having arms with diodes in each arm poled for full wave rectification with one set of conjugate terminals of the bridge constituting alternating current input terminals and the other conjugate terminals constituting direct current output terminals, each arm of one pair of adjacent arms of the bridge comprising a saturable reactor connected in series relation with the diodes of its associated arm, a direct current series type motor having armature and series field windings, negative feedback means for said network comprising a resistor connected in parallel relation with each diode in the arms of the bridge containing the reactors, antihunting means comprising a closed coil circuit arranged in inductive relation with each of said reactors, positive feedback means comprising a pair of coils connected in series relation with said motor armature winding and respectively arranged in inductive relation with said reactors, an adjustable network-ratio adjuster comprising a resistance having a center tap and an adjustable contact arm for the resistance with the center tap connected to the junction point between one reactor and its associated diode and the adjustable arm connected to the junction point between the other reactor and its associated diode, a control resistance unit having two resistance branches connected in parallel relation and in series relation with said motor armature winding across said direct current terminals, a contact arm for each resistance branch with the series field winding of said motor connected to the last mentioned contact arms for effecting reversal of the energization of said field winding, said ratio adjuster contact arm and the contact arms of said control resistance unit being arranged and mechanically interconnected to occupy a neutral position simultaneously on their associated resistance elements and to increase simultaneously the output of the network and the motor torque in either direction as the contact arms are moved in one direction or the other from neutral position.

References Cited in the file of this patent

UNITED STATES PATENTS

| | | |
|---|---|---|
| 2,126,790 | Logan | Aug. 16, 1938 |
| 2,733,307 | Ogle | Jan. 31, 1956 |
| 2,769,130 | Few | Oct. 30, 1956 |
| 2,842,730 | Osborn et al. | July 8, 1958 |
| 2,878,327 | McKenney et al. | Mar. 17, 1959 |
| 2,963,639 | Darling | Dec. 6, 1960 |